United States Patent
Fujita et al.

(10) Patent No.: US 10,171,733 B2
(45) Date of Patent: Jan. 1, 2019

(54) IMAGE PROCESSING APPARATUS AND METHOD, AND PROGRAM AND RECORDING MEDIUM

(71) Applicant: MITSUBISHI ELECTRIC CORPORATION, Tokyo (JP)

(72) Inventors: Takeo Fujita, Tokyo (JP); Koichi Yamashita, Tokyo (JP); Narihiro Matoba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 302 days.

(21) Appl. No.: 15/028,128

(22) PCT Filed: Dec. 4, 2014

(86) PCT No.: PCT/JP2014/082100
§ 371 (c)(1),
(2) Date: Apr. 8, 2016

(87) PCT Pub. No.: WO2015/087772
PCT Pub. Date: Jun. 18, 2015

(65) Prior Publication Data
US 2016/0241782 A1    Aug. 18, 2016

(30) Foreign Application Priority Data
Dec. 11, 2013 (JP) .................. 2013-256168

(51) Int. Cl.
H04N 5/232    (2006.01)
H04N 5/235    (2006.01)
(Continued)

(52) U.S. Cl.
CPC ....... *H04N 5/23238* (2013.01); *G06T 3/0043* (2013.01); *H04N 5/235* (2013.01);
(Continued)

(58) Field of Classification Search
CPC .................................................. H05N 5/23238
(Continued)

(56) References Cited

U.S. PATENT DOCUMENTS 5,959,670 A    9/1999    Tamura et al.
2011/0193967 A1*    8/2011    Matsumoto .............. G03B 7/18
348/164
(Continued)

FOREIGN PATENT DOCUMENTS

JP    4-023576 A    1/1992
JP    6-350888 A    12/1994
(Continued)

*Primary Examiner* — Yulin Sun
(74) *Attorney, Agent, or Firm* — Birch, Stewart, Kolasch & Birch, LLP

(57) ABSTRACT

In a camera which electronically realizes panning, tilting, and zooming, on the basis of the luminance detected in each frame period (n−1), a condition of exposure for two frame periods thereafter (n+1), and digital gain for three frame periods thereafter (n+2) are set. When an instruction for changing the extracted region is received in a certain frame period (n−1), the region extracted from the image is changed three frame periods thereafter. It is possible to achieve a stable exposure control by which the luminance of the image varies little even when the region extracted from the image is switched.

17 Claims, 7 Drawing Sheets

(51) Int. Cl.
*G06T 3/00* (2006.01)
*H04N 5/243* (2006.01)
*H04N 5/262* (2006.01)

(52) U.S. Cl.
CPC ........... *H04N 5/2351* (2013.01); *H04N 5/243* (2013.01); *H04N 5/2628* (2013.01)

(58) Field of Classification Search
USPC .......................................................... 348/36
See application file for complete search history.

(56) References Cited

U.S. PATENT DOCUMENTS

2012/0044328 A1* 2/2012 Gere ........................ H04N 9/09
348/48
2013/0027581 A1* 1/2013 Price .................... H04N 5/2351
348/229.1

FOREIGN PATENT DOCUMENTS

| | | |
|---|---|---|
| JP | 7-087384 A | 3/1995 |
| JP | 9-018773 A | 1/1997 |
| JP | 10-079882 A | 3/1998 |
| JP | 2000-261717 A | 9/2000 |
| JP | 2007-074070 A | 3/2007 |
| JP | 2008-187393 A | 8/2008 |
| JP | 2010-252002 A | 11/2010 |
| JP | 2013-090169 A | 5/2013 |

* cited by examiner

FIG. 3(a)
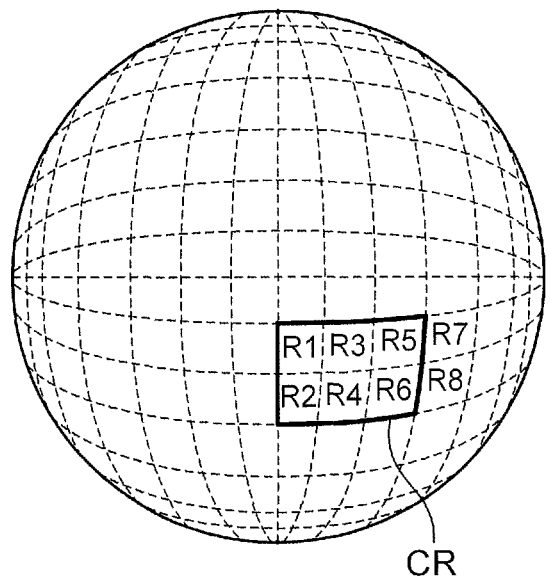
FIG. 3(b)
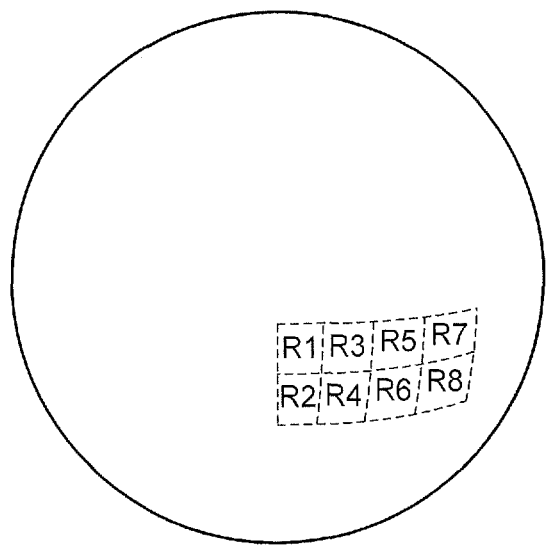
FIG. 3(c)
FIG. 3(d)
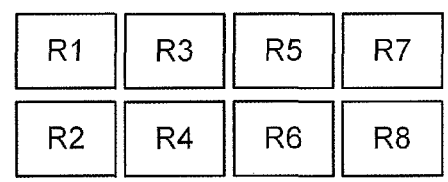

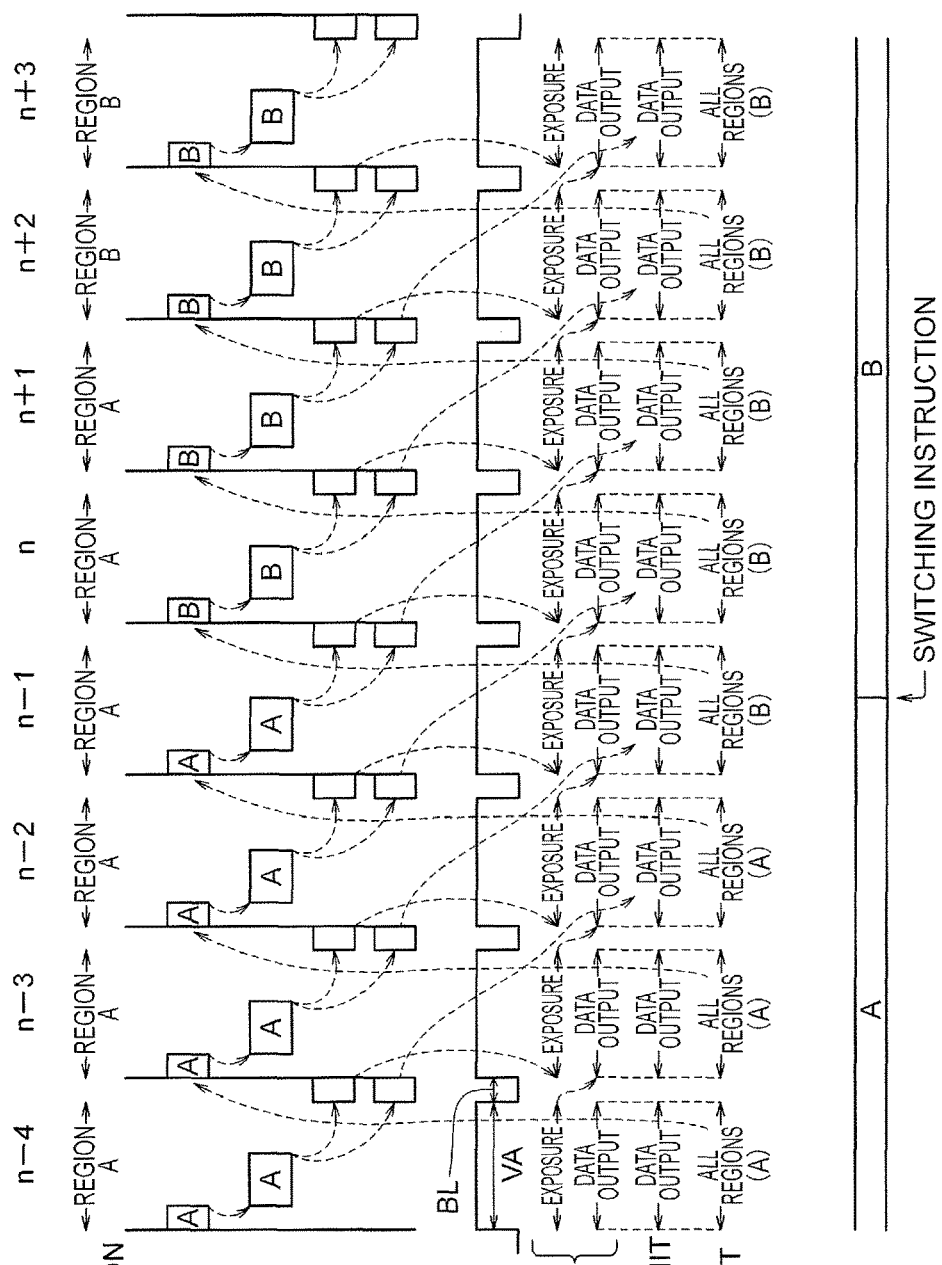

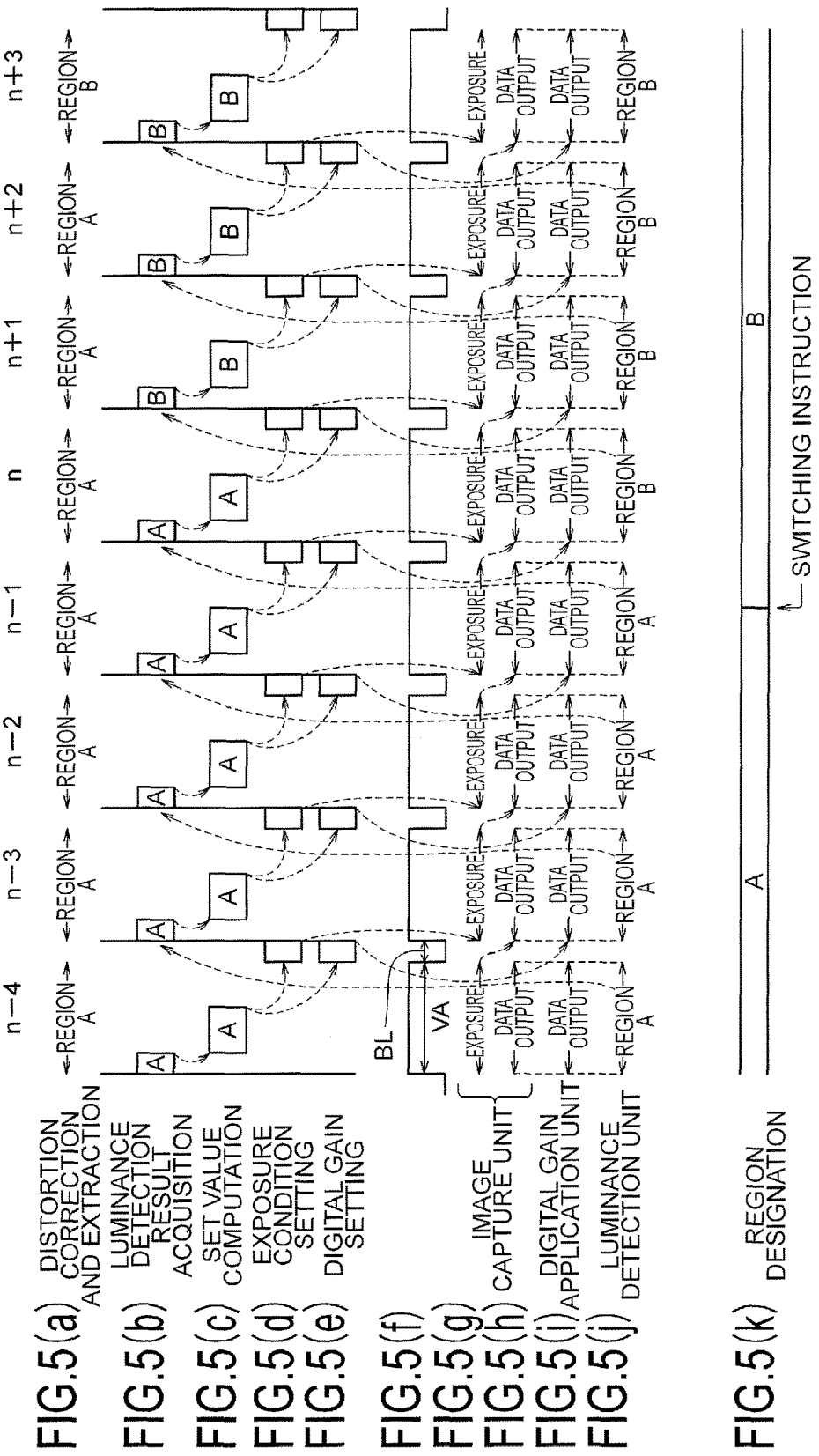

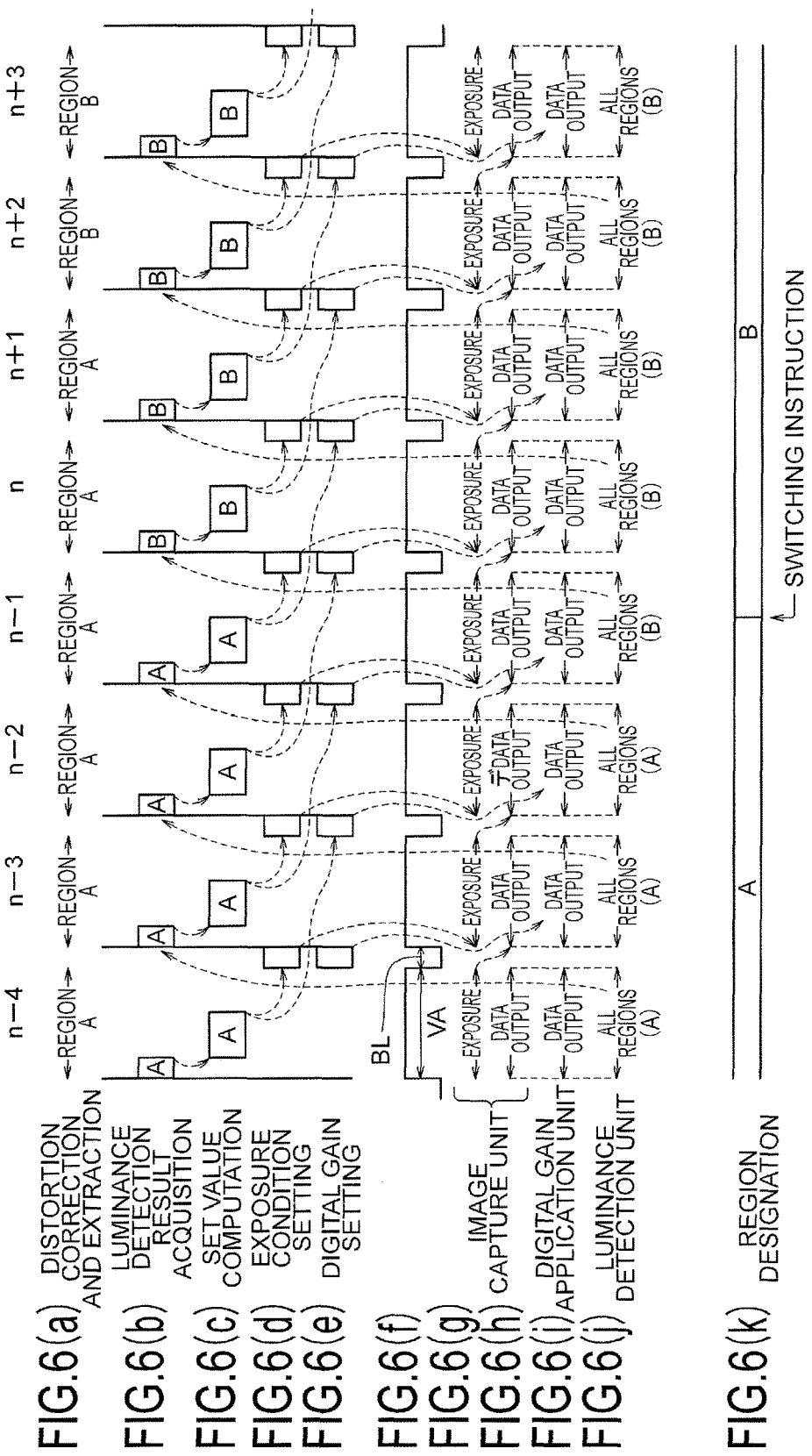

IMAGE PROCESSING APPARATUS AND METHOD, AND PROGRAM AND RECORDING MEDIUM

TECHNICAL FIELD

The present invention relates to an image processing apparatus and method, and in particular to an image processing apparatus and method which is suitable for application to a surveillance camera, and in which a region which is a part of an image obtained by image capture with a wide angle of view using a wide-angle lens, e.g., a fisheye lens, is extracted, and enlarged, and displayed, and at the same time the position and the size of the extracted region are switched to perform panning, tilting or zooming of the image, and in particular to its exposure control technique. The present invention also relates to a program for having a computer to implement part or the entirety of the elements of the image processing apparatus, or part or the entirety of the processes in the image processing method, and a recording medium in which the program is stored.

BACKGROUND ART

A camera by which a part of the image obtained by image capture is extracted and displayed, and the position and the size of the extracted region can be changed is disclosed in patent reference 1. In patent reference 1, when a part of the image is extracted and displayed, the exposure control is performed using the luminance information of the entire screen, rather than the extracted region, so as to reduce the effects of the variation in the luminance of a localized object.

PRIOR ART REFERENCES

Patent References

Patent reference 1: Japanese Patent Application Publication No. H04-23576 (pages 14-20, FIG. 1).

SUMMARY OF THE INVENTION

Problem to be Solved by the Invention

When the exposure control is performed by constantly using the image before the extraction, as described in patent reference 1, the luminance of the image obtained as a result of the exposure control is stable, being free from substantial variation; but, with an object condition in which the luminance varies from one region to another, if only a low-luminance region is extracted and displayed, the screen as a whole becomes dark, and the visibility of the image is lowered; while if a high luminance region only is extracted and displayed, blown-out highlights in the image, or saturation of the pixel values may occur, and the visibility of the objects is lowered.

To solve this problem, it is necessary to perform the exposure processing by referring to the extracted image region; but when the setting of the panning, tilting, or zooming of the image is switched at a high rate, the image region referred to is changed frequently, so that the luminance information varies upon all such occasions, with the result that the exposure control process using the luminance information becomes unstable, and the brightness of the displayed image is changed at the time of switching.

In view of the above, an object of the present invention is to provide an image processing apparatus in which extraction, enlargement, and distortion correction are performed while changing the position and the size of the extracted region of the image obtained by image capture using a lens with a wide angle of view, thereby to electronically perform panning, tilting, or zooming, and which can perform stable exposure control with little variation in the luminance of the image, even when the region extracted from the image is switched.

Means for Solving the Problem

An image processing apparatus according to the present invention comprises:

a digital gain application unit for multiplying, by a digital gain, a captured image signal output from an image capture unit which captures images in units of frame periods, to generate a luminance-adjusted captured image signal;

a luminance detection unit for detecting luminance of each of a plurality of regions which respectively form parts of a captured image represented by the captured image signal generated by said digital gain application unit;

an extraction unit for selecting one of the plurality of regions of the captured image, in accordance with designation information designating a region to be extracted, extracting an image of the selected region, and performing distortion correction; and a control unit for, on a basis of the luminance detected by said luminance detection unit, setting a condition of exposure in said image capture unit, and setting the digital gain used in said digital gain application unit; wherein when the designation information is changed from information designating a first region to information designating a second region, in a first frame period, said control unit changes the luminance used for setting said condition of the exposure and said digital gain in a frame period immediately following said first frame period, from the luminance of said first region to the luminance of said second region, and instructs said extraction unit to change the region extracted from the captured image signal, from said first region to said second region, upon expiration of three frame periods after said first frame period.

Effects of the Invention

According to the present invention, it is possible to achieve exposure control which is stable, and which suffers little variation in the luminance of the image even when the extracted region of the image is switched.

BRIEF DESCRIPTION OF THE DRAWINGS

FIGS. 3(a) to (d) are diagrams showing projection of an image from an imaginary sphere onto an image plane, division into a plurality of regions, and combination of images of the plurality of regions.

FIGS. 4(a) to (k) are diagrams showing an example of a sequence of processes in various parts in the first embodiment.

FIGS. 5(a) to (k) are diagrams showing a sequence of processes in various parts in a conventional image processing apparatus.

FIGS. 6(a) to (k) are diagrams showing another example of a sequence of processes in various parts in the first embodiment.

MODE FOR CARRYING OUT THE INVENTION

First Embodiment

Figure 1:
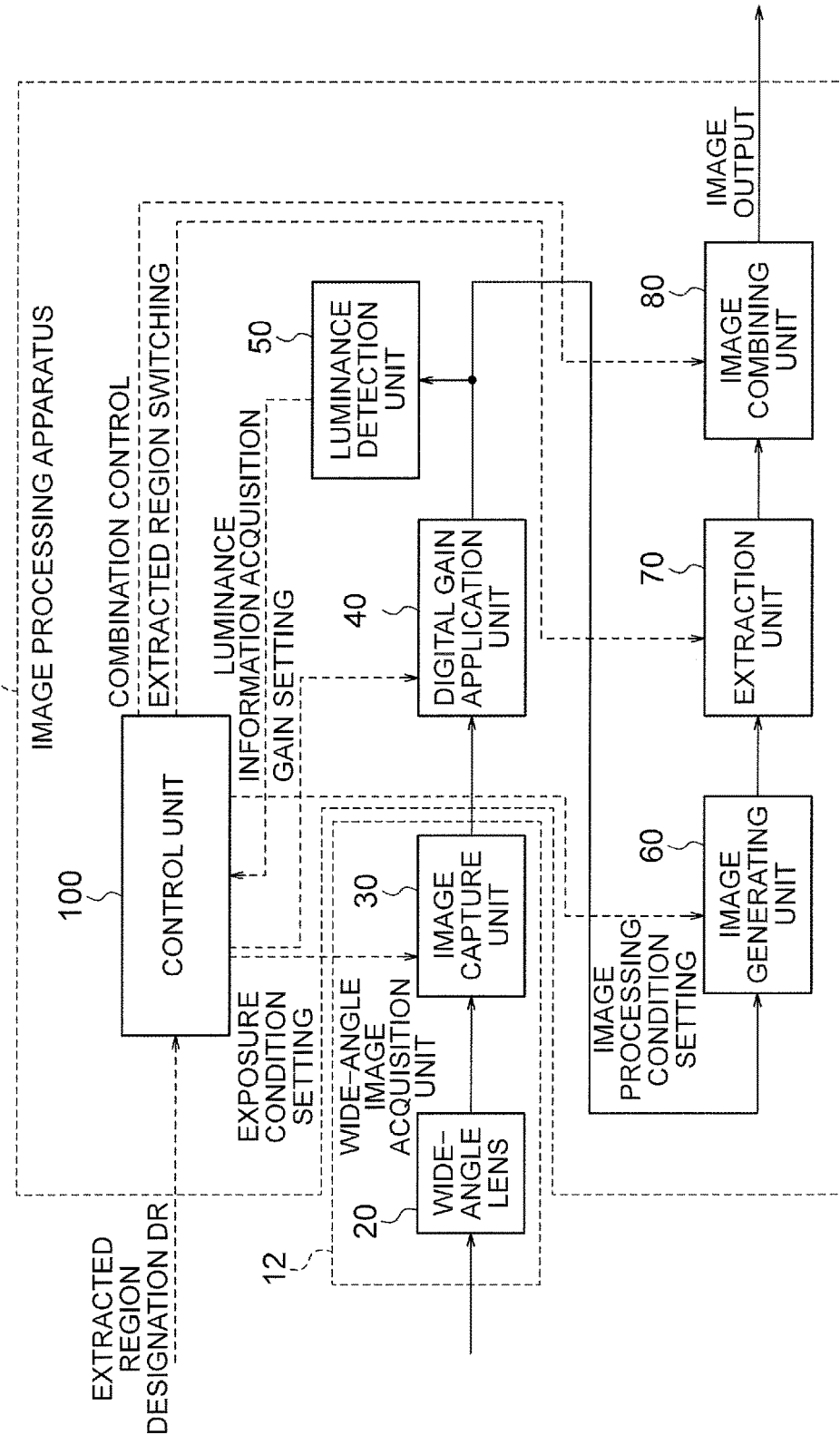
FIG. 1 is a block diagram showing an image generating apparatus provided with an image processing apparatus according to a first embodiment of the present invention.

FIG. 1 shows an image generating apparatus 10 provided with an image processing apparatus according to a first embodiment of the present invention. The illustrated image generating apparatus 10 is provided with a wide-angle image acquisition unit 12 and an image processing apparatus 14.

The wide-angle image acquisition unit 12 includes a wide-angle lens 20 and an image capture unit 30.

The image processing apparatus 14 includes a digital gain application unit 40, a luminance detection unit 50, an image generating unit 60, an extraction unit 70, and an image combining unit 80.

The wide-angle lens 20 is constituted, for example, of a fisheye lens, and forms an image of a wide angle of view on an image plane of the image capture unit 30.

Figure 2:
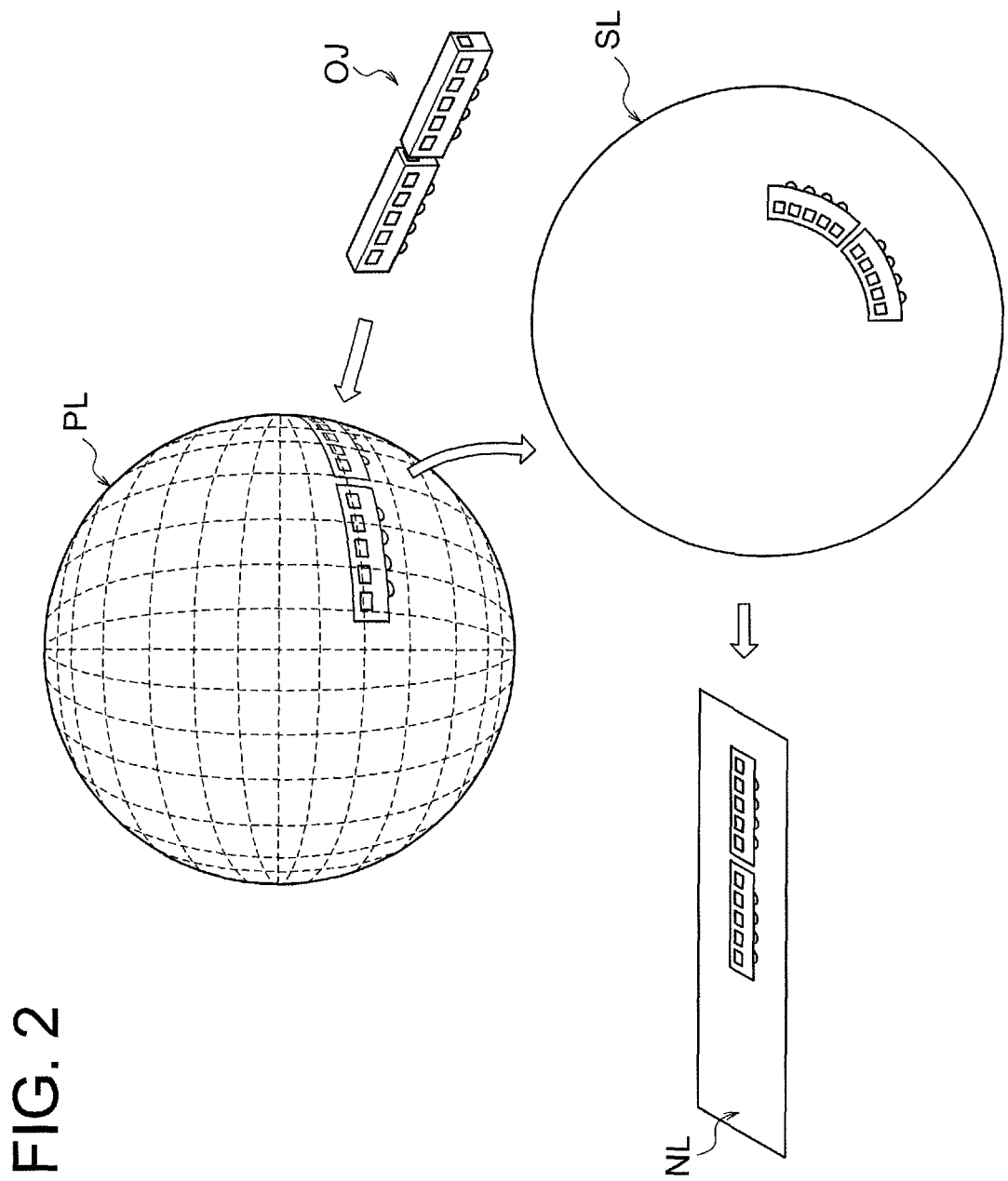
FIG. 2 is a diagram showing an example of projection of an image in image capture using a wide-angle lens, and distortion correction.

Image capture by use of a fisheye lens can be represented as projection of an object OJ in the real space onto an imaginary sphere PL, and projection from the imaginary sphere PL onto a planar image plane SL, as shown in FIG. 2. The image on the image plane SL undergoes correction depending on the intended use of the image, for instance, correction (distortion correction) for altering the image to be closer to an image obtained by ordinary image capture, that is, an image NL obtained by perspective projection.

The image capture unit 30 is constituted of an image sensor for converting the image formed, into electronic data, and outputting the electronic data. The image capture unit 30 generates a captured image in units of predetermined frame periods, that is, every frame period, and a captured image signal representing the captured image generated by charge accumulation due to exposure in each frame period is output in a next frame period. The image capture unit 30 has a Bayer arrangement of R pixels, G pixels, and B pixels, and the captured image signal is composed of pixel values (color signals) respectively obtained at the R pixels, G pixels and B pixels. The exposure time and the gain (analog gain) of the image capture unit 30 are variable, and by varying the exposure time and the gain, the brightness of the captured image can be adjusted.

The digital gain application unit (digital amplifier) 40 multiplies the captured image signal from the image capture unit 30 by a gain (digital gain), that is, it applies a gain factor. The gain used for the multiplication is variable, and, as in the image capture unit 30, by controlling the gain, the brightness of the image output from the digital gain application unit 40 can be adjusted. As was described above, the captured image signal generated by carrying out the exposure with an exposure condition in a certain frame period (first frame period) in the image capture unit 30 is output in the next frame period (second frame period). The multiplication by the digital gain at the digital gain application unit 40 in each frame period, is made on the captured image signal that is generated as a result of the exposure in the preceding frame period in the image capture unit 30, and input from the image capture unit 30.

The control unit 100 divides the image on the image plane SL into a plurality of regions, and instructs the luminance detection unit 50 to perform luminance detection of each of the regions formed by the division.

The luminance detection unit 50 performs the detection of luminance of each of the regions formed by the division by the control unit 100. The detection of luminance is implemented by calculation of an average pixel value for each region. In the present embodiment, the luminance is detected for all of the divided regions in each frame period.

The calculation of the average pixel value for each region in each frame period is completed before the end of the frame period in question, that is, before the next frame period begins.

The image generating unit 60 generates, by color interpolation process, signals of color components which are missing at each pixel position in the image output from the digital gain application unit 40, because of the Bayer arrangement of the pixels of the image capture unit 30, to thereby generate a video signal having signals of all the color components at each pixel position, and also performs image processing such as, color correction, and edge enhancement, in consideration of the illuminance conditions of the objects.

The extraction unit 70 receives the image output from the image generating unit 60, selects one of the regions among the plurality of regions formed by the division by the control unit 100, extracts an image of the selected region, and performs distortion correction and enlargement.

The image combining unit 80 combines the images of a plurality of regions successively output from the extraction unit 70, to form a single image corresponding to an angle of view wider than the angle of view corresponding to each of the regions.

The division of the image by the control unit 100 is, for example, as indicated by dotted lines in FIG. 2 and FIG. 3(a), if shown in connection with the image on the imaginary sphere PL. The extraction by the extraction unit 70 is a process of extracting one of the regions, e.g., the regions R1, R2, . . . , shown in FIG. 3(b).

The regions R1, R2, . . . on the image plane SL in FIG. 3(b) correspond to the regions R1, R2, . . . on the imaginary sphere PL.

The distortion correction by the extraction unit 70 is a process of transforming the image on the image plane SL, to an image suitable for the intended use, e.g., an image closer to an image NL (FIG. 2) obtained by perspective projection.

The combination by the image combining unit 80 is a process of connecting the images of the plurality of regions, for example the images of the regions R1 to R6 shown in FIG. 3(c), obtained by the successive extraction and distortion correction by the extraction unit 70, to form a single image as shown in FIG. 3(d). The regions which are connected correspond to the regions in a range shown by a contour CR in FIG. 3(a).

The control unit 100 receives designation information DR designating an extracted region, from outside, performs control, in accordance with the designation, over the image capture unit 30, the digital gain application unit 40, the luminance detection unit 50, the image generating unit 60, the extraction unit 70, and the image combining unit 80, with respect to the switching of the extracted region, and the combination of the images.

The designation information DR includes information indicating the position of the extracted region, e.g., the position of its center, and information indicating the size of the extracted region. When identification numbers are pre-assigned to the plurality of regions, information indicating the identification number is also included, and based on this information, the control unit 100 identifies the region to be extracted.

The control unit 100 performs control over the image generating unit 60 with regard to image processing, such as color correction, and edge enhancement, by setting conditions for these image processing in consideration of the illuminance conditions of the objects.

The illuminance conditions of the objects may, for example, be those estimated from the luminance value detected by the luminance detection unit 50.

The control unit 100 also performs control over the image combining unit 80 with regard to the combination of the images.

The control unit 100 also acquires the luminance detection result (pixel average value) output from the luminance detection unit 50, and, performs, based on the thus-acquired luminance detection result, the setting of the exposure condition in the image capture unit 30, and setting of the digital gain in the digital gain application unit 40.

The setting of the exposure condition in the image capture unit 30 includes setting of the exposure time and setting of the gain (analog gain).

FIGS. 4(*a*) to (*k*) show a sequence of operations of the control unit 100, the image capture unit 30, the digital gain application unit 40, and the luminance detection unit 50.

FIGS. 4(*a*) to (*k*) show operations during eight frame periods, from frame n−4 to frame n+3, at the time of switching from a certain region (first region) A, to another region (second region) B. Each of the regions A and B is, for example, one of the regions R1 to R6.

FIGS. 4(*a*) to (*k*) assume a situation in which an instruction for switching the region is given in frame n−1.

FIG. 4(*a*) shows regions extracted by the extraction unit 70. In the illustrated example, the region A is extracted up to frame n+1, and the region B is extracted in and after frame n+2.

FIGS. 4(*b*), (*c*), (*d*) and (*e*) show processes by the control unit 100.

FIG. 4(*b*) shows the process of acquiring the result of the luminance detection from the luminance detection unit 50.

In the present embodiment, the luminance detection is made for all the regions in each frame, as was described above, but the control unit 100 acquires the detection result of just one of the regions, and uses it for the computation of the set values.

In the illustrated example, the luminance detection result of the region A is acquired up to frame n−1, and the luminance detection result of the region B is acquired in and after frame n.

FIG. 4(*c*) shows the computation of the set values based on the result of the luminance detection acquired by the process in FIG. 4(*b*); FIG. 4(*d*) shows the setting in the image capture unit 30, of the set values of the exposure condition (exposure time, and analog gain) determined as a result of the computation in FIG. 4(*c*); and FIG. 4(*e*) shows the setting in the digital gain application unit 40, of the digital gain set value determined as a result of the computation in FIG. 4(*c*).

FIG. 4(*f*) shows the valid image period VA and the vertical blanking period BL in each frame.

In FIGS. 4(*b*) to (*e*), the position, in the time axis direction, of a rectangle representing each process schematically indicates the time at which each process is carried out.

In FIGS. 4(*b*) to (*j*), an arrow-headed line drawn from one process to another process indicates transmission of information or a signal representing the result obtained at each process, to another process.

The process of acquiring the result of the luminance detection in FIG. 4(*b*) is carried out at the beginning of each frame. The luminance detection result acquired in each frame is obtained by calculation of an average value of pixel values in the immediately preceding frame. The region of which the luminance detection result is to be acquired is decided at the beginning of each frame, and, therefore, the luminance detection is made for all the regions in the preceding frame.

The process of the set value computation in FIG. 4(*c*) is carried out after the process of FIG. 4(*a*), within the same frame period.

The process of setting the exposure condition in the image capture unit 30, and the process of setting the digital gain in the digital gain application unit shown in FIG. 4(*d*) and FIG. 4(*e*) are carried out after the process of FIG. 4(*c*), within the same frame period, specifically, during the vertical blanking period BL at the end of the frame period in question.

By carrying out the process of the setting during the blanking period BL, it is possible to avoid changes in the brightness of the image within the same frame, that might occur if the setting is changed during the valid image period VA.

FIG. 4(*g*) and FIG. 4(*h*) show processes in the image capture unit 30.

FIG. 4(*g*) shows exposure processes, while FIG. 4(*h*) shows data output.

FIG. 4(*i*) shows the data output from the digital gain application unit 40, and FIG. 4(*j*) shows the detection of the luminance (measurement of the pixel values for that purpose) by the luminance detection unit 50.

In the present embodiment, as was described above, the luminance detection is made for all the regions in each frame; this is indicated by the characters "ALL REGIONS" in FIG. 4(*j*), and the region of which the luminance value detection result is acquired at the beginning of the next frame is indicated in the parentheses after the characters "ALL REGIONS" in FIG. 4(*j*).

In the illustrated example, the luminance detection result of the region A in each of the frames up to frame n−2 is acquired at the beginning of the next frame, and the luminance detection result of the region B in each of the frames in and after frame n−1 is acquired at the beginning of the next frame.

What follows is a description on the processes in which the result of the luminance detection by the luminance detection unit 50 is used for the setting of the exposure condition in the image capture unit 30, the setting of the digital gain in the digital gain application unit 40, and the data obtained with these settings is output (the luminance detection result is reflected in the output data) is explained.

For example, in frame n−4, the luminance detection is made for all the regions including the region A (FIG. 4(*j*)); the luminance detection result of the region A is acquired by the control unit 100 at the beginning of frame n−3 (FIG. 4(*b*)); in the same frame n−3, the computation of the set values (FIG. 4(*c*)), the setting in the image capture unit 30 (FIG. 4(*d*)), and the setting in the digital gain application unit 40 (FIG. 4(*e*)) are carried out; in response to these settings, the exposure (FIG. 4(*g*)) in the next frame n−2 is performed by the image capture unit 30; the captured image signal generated as a result of the exposure is output from the image capture unit 30 in frame n−1 immediately following the above-mentioned next frame; and in the same frame n−1, the multiplication by the digital gain at the digital gain application unit 40 is performed (FIG. 4(*i*)).

Thus, the data obtained by the exposure in frame n−2 performed with the exposure condition set in frame n−3 is output from the image capture unit in frame n−1 (FIG. 4(*h*)), and the data is multiplied by the digital gain which is set also in frame n−3.

There is a delay of two frame periods from the acquisition (frame n−3) of the luminance detection result to the output (frame n−1) of the data generated as a result of the exposure with the exposure condition set based on the result of the acquisition, and the multiplication by the digital gain set based on the result of the acquisition.

According to the present invention, if an instruction for switching to the extracted region B (change of the designated region) is given in a certain frame, e.g., frame n−1 (FIG. 4(*k*)), the control unit 100 switches the region of which the luminance detection result is acquired, to the region B, in the next frame n (acquires the luminance detection result of the region B in frame n−1); and, starting with frame n+2, which is two frames thereafter (three frames after the instruction for the switching), the extracted region is switched to the region B (FIG. 4(*a*)).

The reason why it is possible to switch the region of which the luminance detection result is acquired at the beginning of frame n, which immediately follows the frame in which the extracted region switching is instructed is that the luminance information detection is made for all the regions in each frame.

In frame n+1 before the extracted region switching, the region A is extracted; in this frame n+1, the data obtained as a result of the exposure (frame n) with the exposure condition set based on the luminance detection result of the region A acquired in frame n−1, and the multiplication (frame n+1) by the digital gain set based on the luminance detection result of the region A acquired in frame n−1, is output.

In frame n+2 after the extracted region switching, the region B is extracted; in this frame n+2, the data obtained as a result of the exposure (frame n+1) with the exposure condition set based on the luminance detection result of the region B acquired in frame n, and the multiplication (frame n+2) by the digital gain set based on the luminance detection result of the region B acquired in frame n.

Thus, before and after the extracted region switching, the data of each extracted region is obtained as a result of the exposure and the digital gain multiplication with the conditions set based on the luminance detection result of the same region.

For the purpose of comparison, the processes in the conventional configuration will be explained with reference to FIGS. 5(*a*) to (*k*).

In the conventional method, the luminance detection in each frame is made only for the region being selected. For instance, it is assumed that a switching demand is given in frame n−1 as shown in FIG. 5(*k*).

In this case, as shown in FIG. 5(*j*), the luminance of the region A is detected up to frame n−1, and the luminance of the region B is detected in and after frame n.

As a result, the luminance detection result of the region A is acquired up to frame n, and the luminance detection result of the region B is acquired in and after frame n+1 (FIG. 5(*b*)).

Accordingly, up to frame n, the set value computation, the setting of the exposure condition, and the setting of the digital gain are made based on the luminance detection result of the region A; in an after frame n+1, the set value computation, the setting of the exposure condition, and the setting of the digital gain are made based on the luminance detection result of the region B.

Furthermore, up to frame n+1, the exposure with the exposure condition set based on the luminance detection result of the region A and the multiplication by the digital gain set based on the luminance detection result of the region A are performed; and, in and after frame n+2, the exposure with the exposure condition set based on the luminance detection result of the region B and the multiplication by the digital gain set based on the luminance detection result of the region B are performed.

Because of these processes, the data (FIG. 5(*h*)) output from the image capture unit as a result of the exposure (FIG. 5(*g*)) with the exposure condition set based on the luminance detection result of the region A in frame n+1, is multiplied in frame n+2 (FIG. 5(*i*)) by the digital gain set based on the luminance detection result of the region B.

In and after frame n+3, the data obtained by the exposure with the exposure condition set based on the luminance detection result of the region B, and multiplication by the digital gain set based on the luminance detection result of the region B is output.

For this reason, the extracted region is switched between frame n+2 and frame n+3, and the region B is extracted in and after frame n+3.

Accordingly, there is a delay of four frame periods, from the beginning of the frame in which the extracted region switching is instructed (FIG. 5(*k*)), to the extracted region switching.

In contrast, according to the present invention, the delay from the beginning of the frame in which the extracted region switching is instructed (FIG. 4(*k*)), to the extracted region switching (FIG. 4(*a*)) is three frame periods.

Also, in the case of FIGS. 5(*a*) to (*k*), the data output in frame n+2 is obtained by adjustment based on the exposure condition set based on the luminance detection result of the region A, and the digital gain set based on the luminance detection result of the region B, so that it is not ensured that the brightness is properly controlled, and the brightness may differ from the preceding or following frame.

In contrast, in the case of FIGS. 4(*a*) to (*k*), before the extracted region switching, an image obtained as a result of the exposure with the exposure condition set based on the luminance detection result of the region A, and the multiplication by the digital gain set based on the luminance detection result of the same region A is output; after the extracted region switching, an image obtained as a result of the exposure with the exposure condition set based on the luminance detection result of the region B, and the multiplication by the digital gain set based on the luminance detection result of the same region B is output. That is, both before and after the region switching, the brightness of the image is properly adjusted.

In the example shown in FIGS. 4(*a*) to (*k*), the digital gain is set in the digital gain application unit 40 in the same frame as that in which the computation of the set values is made, and the use of the thus-set digital gain is deferred by one frame in the digital gain application unit 40; but as shown in FIGS. 6(*a*) to (*k*), the digital gain may be set in the digital gain application unit 40 in the frame immediately following the frame in which the computation of the set values is made, and the digital gain application unit 40 may immediately use the newly set digital gain for the multiplication. That is, the delaying process may be performed in the control unit 100, instead of the digital gain application unit 40.

In the embodiment described above, the luminance detection unit detects the luminance of all the regions in each frame; but the luminance detection unit may detect the luminance of only those regions which are scheduled to be extracted or which have a possibility of being extracted. For example, in the example described above, in the case where the regions R1 to R6 are successively selected, and the image is taken out from the selected region, only the regions R1 to R6 may be treated as the region which is currently extracted or the regions which have a possibility of being extracted, and the luminance detection in each frame may be made only for these regions.

In the embodiment described above, the regions (R1 to R6, or the like) which are to be extracted are shown to be non-overlapping with each other; but images of the regions which overlap with each other at the edges may be generated, and, at the time of combination, weighted addition or selection may be made for the overlapping parts.

In the embodiment described above, the images of different regions successively extracted by the extraction unit are combined by the image combining unit; but the present invention is not limited to this scheme: for example, the present invention is applicable to a configuration in which the image of the extracted region is displayed as is (without being connected with the images of other regions). In this case, if a region to be extracted next is known when a certain region is being extracted, the luminance detection may be made for that region known to be extracted next. Also, if it is known, when a certain region is being extracted, that the region to be extracted next is one of a plurality of known regions (e.g., one of the regions neighboring the region currently being extracted), the luminance detection may be made for the above-mentioned plurality of known regions.

Also, where a plurality of regions are connected to form a single combined image, the regions forming parts of the combined image may be successively replaced so that the range occupied by the combined image is moved gradually. For instance, from the state in which the combined image is formed of the regions R1 to R6 as in FIG. 2(a), the regions R1 and R2 at the left end may be removed, and the regions R7 and R8 neighboring on the right side may be added in place, so as to form a combined image consisting of the regions R3 to R8; and the similar processes may be repeated thereafter.

In this case too, when the direction of the movement is known, the luminance detection in each frame may be made, not only of the regions R1 to R6 which are currently combined, but also of the regions R7, and R8, which are scheduled to be combined next. If the direction of the movement is not known, but it is known that adjacent regions on either side are successively added, and the regions on the opposite side are removed, the luminance detection in each frame may be made not only of the regions which are currently combined, but also of the adjacent regions (the regions which may be combined).

In the embodiment described above, the switching is made between regions occupying different positions in the image; but the present invention can be applied to cases where switching is made between one region, and another region which includes, as its part, the above-mentioned one region (between a narrower region and a wider region). A zoom process can be achieved by selecting and displaying the images of narrower and wider regions in succession.

The present invention is applicable to cases in which the switching is made between a plurality of regions which are at the same position (central position) and have different inclination (tilt) angles. Display with different tilt angles can be made by selecting and displaying the regions with different tilt angles in succession.

As has been described, according to the present invention, it is possible to perform exposure control that is stable and causes little variation in the luminance of the image, even when the switching of the region extracted from the image is performed, and the delay from the instruction for the extracted region switching, to the execution of the switching is short.

Second Embodiment

In the first embodiment described above, the regions extracted from the image and the regions forming units in the luminance detection are identical; but the present invention is applicable to cases where the regions extracted from the image and the regions forming units of the luminance detection are different. In the following description, for the purpose of distinction from the extracted region, the region forming a unit of the luminance detection is referred to as a "section". When the sections, that is, the regions forming units of the luminance detection, are smaller than extracted regions of the image, and each extracted region extends over a plurality of sections, that is, when each of the plurality of sections is at least partly included in the extracted region, the luminance of the extracted region may be calculated based on the luminance of the plurality of sections. For example, the captured image may be divided into a plurality of rectangular sections (blocks), and the luminance of each block may be detected, and the luminance of the extracted region may be calculated based on the luminance of each of the blocks which are at least partly included in the extracted region.

Figure 7A:
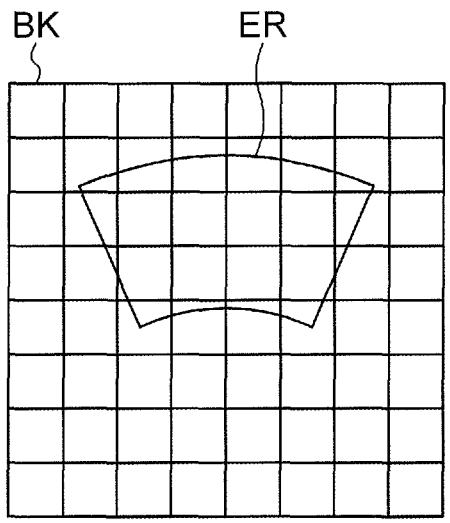
FIGS. 7(a) to (d) are diagrams showing the relations between an extracted region and a plurality of sections used for the calculation of the luminance of the extracted region in a second embodiment of the present invention.
Figure 7B:
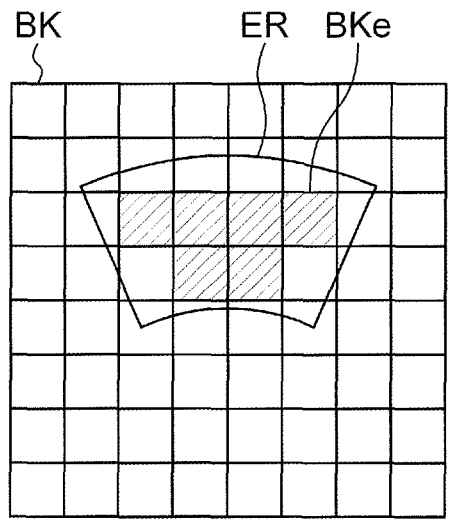
Figure 7C:
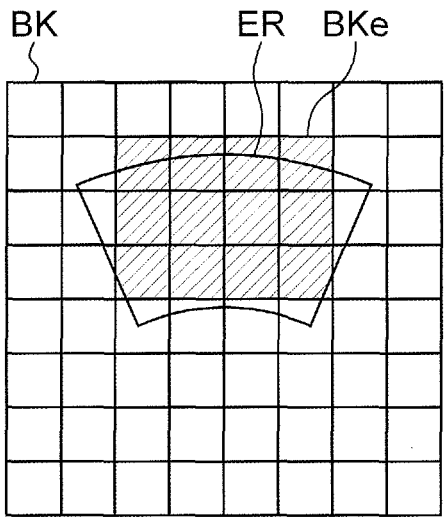
Figure 7D:
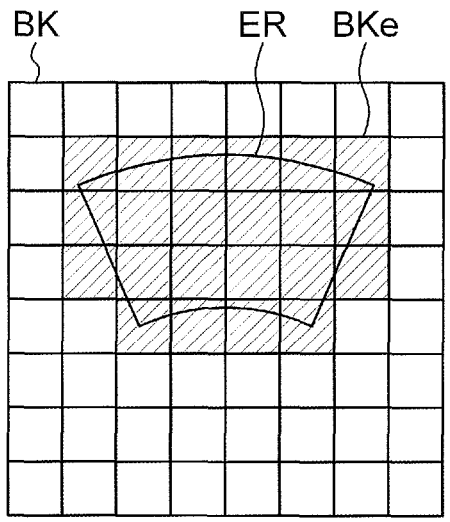

FIG. 7(a) shows an example in which the image is divided by grid lines, into a plurality of rectangular sections (blocks) BK, and an extracted region ER is set to extend over a plurality of the rectangular blocks. In FIGS. 7(b) to (d), the blocks BKe which are used for the calculation of the luminance of the extracted region ER are indicated by hatching. In the example of FIG. 7(b), only those blocks BKe which are entirely included in the extracted region ER are used for the calculation of the luminance of the extracted region ER; in the example of FIG. 7(c), only those blocks BKe which each have at least a half thereof included in the extracted region ER are used for the calculation of the luminance of the extracted region ER; in the example of FIG. 7(d), all of the blocks BKe which are at least partly included in the extracted region ER are used for the calculation of the luminance of the extracted region ER.

The calculation of the luminance of the extracted region based on the luminance of the blocks may be simple averaging, or weighted averaging. In the case of the weighted averaging, the weights may be assigned so that they correspond to the proportion of each block which is included in the extracted region.

As has been described, according to the present embodiment, the luminance of the extracted region is calculated by using the luminance of each of the rectangular sections (blocks) formed by dividing the captured image, so that the luminance of the extracted region can be calculated flexibly, regardless of the shape of the extracted region, and even if the shape of the extracted region changes with time.

So far, the image processing apparatus of the present invention has been described; but the image processing method implemented in the above-described image processing apparatus also constitutes part of the present invention. Also part or the entirety of the constituent elements of the above-described image processing apparatus, or part or the entirety of the processes in the above-described image processing method may be realized by software, i.e., a programmed computer. Accordingly, a program for causing a computer to execute part or the entirety of the constituent elements of the above-described image processing apparatus, or part or the entirety of the processes of the above-described image processing method, and a computer-readable recording medium in which the program is recorded also constitute part of the present invention.

REFERENCE CHARACTERS 12 wide-angle image acquisition unit, 14 image processing apparatus, 20 wide-angle lens, 30 image capture unit, 40 digital gain application unit, 50 luminance detection unit, 60 image generating unit, extraction unit, 80 image combining unit, 100 control unit.

What is claimed is:

1. An image processing apparatus comprising:
a digital amplifier for multiplying, by a digital gain, a captured image signal output from an image capture unit which captures images in units of frame periods, to generate a luminance-adjusted captured image signal;
a luminance detector for detecting luminance of each of a plurality of regions which respectively form parts of a captured image represented by the captured image signal generated by said digital amplifier;
an extractor for selecting one of the plurality of regions of the captured image, in accordance with designation information designating a region to be extracted, extracting an image of the selected region, and performing distortion correction; and
a controller for, on a basis of the luminance detected by said luminance detector, setting a condition of exposure in said image capture unit, and setting the digital gain used in said digital amplifier; wherein
when the designation information is changed from information designating a first region to information designating a second region, in a first frame period,
said controller
changes the luminance used for setting said condition of the exposure and said digital gain in a frame period immediately following said first frame period, from the luminance of said first region to the luminance of said second region, and
instructs said extractor to change the region extracted from the captured image signal, from said first region to said second region, upon expiration of three frame periods after said first frame period.

2. The image processing apparatus as set forth in claim 1, wherein said digital amplifier multiplies the captured image signal generated in said image capture unit, as a result of the exposure in each frame period, by the gain in a next frame period, to output the luminance-adjusted captured image signal;
said controller, based on the luminance detected by said luminance detector in said each frame period, sets said condition of the exposure at said image capture unit in a frame period two frame periods after said each frame period, and the digital gain used for the multiplication at said digital amplifier in a frame period three frame periods after said each frame period;
said controller starts determination of said condition of the exposure and said digital gain based on the luminance of said second region in said first frame period, and causes said extractor to extract the image of said second region in and after the frame period three frames after said first frame period.

3. The image processing apparatus as set forth in claim 1, wherein said luminance detector detects the luminance of each of all the regions consisting of the region which is currently extracted in each frame period, and regions which have a possibility of being extracted, among said plurality of regions.

4. The image processing apparatus as set forth in claim 1, wherein said luminance detector detects the luminance of each of a plurality of sections formed by dividing the captured image, and calculates the luminance of each of said plurality of regions based on the luminance of one or more of the sections which are at least partly included in said each of the regions.

5. The image processing apparatus as set forth in claim 2, wherein said controller
performs computation for determination of said condition of the exposure and determination of said digital gain in a frame period immediately following said each frame period, and
performs computation for determination of said condition of the exposure and determination of said digital gain based on a result of detection of the luminance of said second region, in and after the frame period immediately following said first frame period.

6. The image processing apparatus as set forth in claim 5, wherein
said controller sets said condition of the exposure and said digital gain having been determined, in said image capture unit and said digital amplifier, in the frame period immediately following said each frame period; and
said digital amplifier delays use of said digital gain having been set, by one frame period.

7. The image processing apparatus as set forth in claim 5, wherein said controller
sets said condition of the exposure having been determined, in said image capture unit in the frame period immediately following said each frame period, and
sets said digital gain having been determined in said digital amplifier, in the frame period two frame periods after said each frame period.

8. The image processing apparatus as set forth in claim 1, wherein the setting of said condition of the exposure and the setting of said digital gain are performed in a vertical blanking period in each frame period.

9. The image processing apparatus as set forth in claim 1, further comprising an image generating unit for receiving the captured image signal output from said digital amplifier, and performing image processing including color interpolation, color correction, and edge enhancement; wherein
said extractor performs extraction from an image having undergone the image processing in said image generating unit.

10. The image processing apparatus as set forth in claim 1, further comprising an image combining unit for combining the images of the plurality of regions output from said extractor, to generate a single continuous image.

11. The image processing apparatus as set forth in claim 2, wherein said luminance detector detects the luminance of each of all the regions consisting of the region which is currently extracted in each frame period, and regions which have a possibility of being extracted, among said plurality of regions.

12. The image processing apparatus as set forth in claim 2, wherein said luminance detector detects the luminance of each of a plurality of sections formed by dividing the captured image, and calculates the luminance of each of said plurality of regions based on the luminance of one or more of the sections which are at least partly included in said each of the regions.

13. The image processing apparatus as set forth in claim 2, wherein the setting of said condition of the exposure and the setting of said digital gain are performed in a vertical blanking period in each frame period.

14. The image processing apparatus as set forth in claim 2,
further comprising an image generating unit for receiving the captured image signal output from said digital amplifier, and performing image processing including color interpolation, color correction, and edge enhancement; wherein
said extractor performs extraction from an image having undergone the image processing in said image generating unit.

15. The image processing apparatus as set forth in claim 2, further comprising an image combining unit for combining the images of the plurality of regions output from said extractor, to generate a single continuous image.

16. An image processing method comprising:
a digital gain application step for multiplying, by a digital gain, a captured image signal output from an image capture unit which captures images in units of frame periods, to generate a luminance-adjusted captured image signal;
a luminance detection step for detecting luminance of each of a plurality of regions which respectively form parts of a captured image represented by the captured image signal generated by said digital gain application step;
an extraction step for selecting one of the plurality of regions of the captured image, in accordance with designation information designating a region to be extracted, extracting an image of the selected region, and performing distortion correction; and
a control step for, on a basis of the luminance detected by said luminance detection step, setting a condition of exposure in said image capture unit, and setting the digital gain used in said digital gain application step; wherein
when the designation information is changed from information designating a first region to information designating a second region, in a first frame period,
said control step
changes the luminance used for setting said condition of the exposure and said digital gain in a frame period immediately following said first frame period, from the luminance of said first region to the luminance of said second region, and
instructs said extraction step to change the region extracted from the captured image signal, from said first region to said second region, upon expiration of three frame periods after said first frame period.

17. A non-transitory computer-readable recording medium in which a program for causing a computer to execute processes of the steps in claim 16 is recorded.

* * * * *